(12) United States Patent
Szlag et al.

(10) Patent No.: US 10,040,375 B2
(45) Date of Patent: Aug. 7, 2018

(54) UNLOCKING LEVER FOR A SEAT ADJUSTER OF A VEHICLE SEAT, AND VEHICLE SEAT

(71) Applicant: Volkswagen Aktiengesellschaft, Wolfsburg (DE)

(72) Inventors: Robert Szlag, Wolfsburg (DE); Lars Daenekas, Meine-Grassel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/344,794

(22) Filed: Nov. 7, 2016

(65) Prior Publication Data

US 2017/0050541 A1 Feb. 23, 2017

Related U.S. Application Data

(63) Continuation of application No. PCT/EP2015/059642, filed on May 4, 2015.

(30) Foreign Application Priority Data

May 5, 2014 (DE) .................. 10 2014 208 342

(51) Int. Cl.
 *A47C 1/00* (2006.01)
 *B60N 2/10* (2006.01)
 *B60N 2/12* (2006.01)

(52) U.S. Cl.
 CPC ........ *B60N 2/10* (2013.01); *B60N 2/12* (2013.01)

(58) Field of Classification Search
 CPC ........... B60N 2/10; B60N 2/12; B60N 2/2875

USPC ... 297/344.1, 344.11–344.15, 358, 337, 338, 297/361.1, 463.1, 463.2, 354.1, 354.12, 297/344.14; 296/65.18, 65.01
See application file for complete search history.

(56) References Cited

U.S. PATENT DOCUMENTS

| 7,472,963 | B2 * | 1/2009 | Jeong ................... | B60N 2/0296 297/463.1 |
| 7,938,490 | B2 * | 5/2011 | Ishijima ............... | B60N 2/0296 297/344.1 |
| 7,959,229 | B2 | 6/2011 | Ishijima et al. | |
| 8,038,206 | B2 | 10/2011 | Ito et al. | |

(Continued)

FOREIGN PATENT DOCUMENTS

| CN | 1958333 A | 5/2007 |
| CN | 101870267 A | 10/2010 |

(Continued)

OTHER PUBLICATIONS

Chinese Office Action for Chinese Application No. 201580023085.8 dated Mar. 21, 2018 with English translation.

*Primary Examiner* — Mark R Wendell
(74) *Attorney, Agent, or Firm* — Muncy, Geissler, Olds & Lowe, P.C.

(57) ABSTRACT

An unlocking lever having a holder for a traction element of a seat adjuster of a vehicle seat. The unlocking lever has a first lever which can be rotated about a first rotational axis and a second lever which can be rotated about a second rotational axis. The first and the second levers are interconnected by means of the second rotational axis in an articulated manner, and the holder for the traction element is arranged between both rotational axis on the second lever.

22 Claims, 2 Drawing Sheets

(56) References Cited

U.S. PATENT DOCUMENTS

| | | | |
|---|---|---|---|
| 9,022,477 B2* | 5/2015 | Pleskot | B60N 2/06 297/361.1 |
| 9,539,919 B2 | 1/2017 | Pleskot | |
| 2009/0026791 A1* | 1/2009 | Ishijima | B60N 2/0296 296/65.18 |
| 2009/0026825 A1* | 1/2009 | Ishijima | B60N 2/0296 297/358 |
| 2009/0058158 A1* | 3/2009 | Sobieski | B60N 2/0296 297/338 |
| 2010/0109406 A1* | 5/2010 | Ueda | B60N 2/0296 297/358 |
| 2010/0270455 A1 | 10/2010 | Obrecht | |
| 2013/0187424 A1 | 7/2013 | Pleskot | |

FOREIGN PATENT DOCUMENTS

| | | |
|---|---|---|
| CN | 103223885 A | 7/2013 |
| DE | 101 42 833 A1 | 3/2003 |
| DE | 10 2005 003 817 A1 | 8/2006 |
| DE | 20 2008 009 745 U1 | 12/2009 |
| EP | 1 942 028 A1 | 7/2008 |
| EP | 2 060 435 A1 | 5/2009 |
| JP | H08-11606 A | 1/1996 |
| JP | 2005-080740 A | 3/2005 |
| JP | 2006-069330 A | 3/2006 |
| JP | 2008-001139 A | 1/2008 |

* cited by examiner

UNLOCKING LEVER FOR A SEAT ADJUSTER OF A VEHICLE SEAT, AND VEHICLE SEAT

This nonprovisional application is a continuation of International Application No. PCT/EP2015/059642, which was filed on May 4, 2015, and which claims priority to German Patent Application No. 10 2014 208 342.7, which was filed in Germany on May 5, 2014, and which are both herein incorporated by reference.

BACKGROUND OF THE INVENTION

Field of the Invention

The present invention relates to an unlocking lever for a seat adjuster of a vehicle seat, and a vehicle seat.

Description of the Background Art

Unlocking levers are typically provided for actuating seat adjusters of vehicle seats, for example of motor vehicles such as passenger cars, trucks, or buses, or even other vehicles such as aircraft, ships, or trains. Along with the technical design, in particular of the force transmission between the unlocking lever and the unlocking mechanism, operating ergonomics are a primary concern.

DE 10 2005 003 817 A1 describes a motor vehicle seat with a fold-down backrest that can be folded down by means of an operating lever supported so as to pivot about a rotational axis and transmission through a Bowden cable.

DE 101 42 833 A1 describes a drive for adjusting devices on vehicle seats wherein an actuating lever supported so as to pivot in a rotational axis is designed as an armrest on the tunnel side.

DE 20 2008 009 745 U1 describes an actuating device for unlocking a seat backrest with a lever-like actuating element that acts on the unlocking mechanism through a Bowden cable.

The prior art solutions are not always intuitive to operate, since the pulling or movement of the actuating lever is opposite the adjustment motion of the vehicle seat for one direction of adjustment.

SUMMARY OF THE INVENTION

It is therefore an object of the invention to improve the seat adjustment of a vehicle seat.

The unlocking lever according to an exemplary embodiment of the invention includes a holder for a tension member of a seat adjustor of a vehicle seat that makes provision that the unlocking lever has a first lever that is rotatable about a first swivel pin and a second lever that is rotatable about a second swivel pin, wherein the first and second levers are joined in an articulated manner by means of the second swivel pin, and that the holder for the tension member is located on the second lever between the two swivel pins.

The unlocking lever according to an exemplary embodiment of the invention has the advantage that the unlocking lever can be actuated in two directions of actuation thanks to the two swivel pins or tilt axes and the two levers. These two directions can correspond to the direction of travel of the vehicle in which the seat is located. With respect to a pivot axis of the seat adjuster, the two directions can correspond to a raising direction of the seat or a seat part and a returning direction of the seat or a seat part. The user can now choose between the two levers, and thus the two directions of actuation, and intuitively choose the direction of actuation that is best for him. This improves convenience and minimizes the possibility of incorrect operation. The invention thus makes possible a seat adjuster with which the seat or a seat part can be adjusted in parallel with, which is to say in the same direction as, the unlocking lever. In concrete terms, a seat can be moved in the direction of travel by a lever motion in the direction of travel, and can be moved opposite the direction of travel by a lever motion opposite the direction of travel, which permits a very smooth motion.

In an embodiment of the invention, provision is made that the first lever has a recess for the tension member. This permits a centered arrangement of the tension member, which improves not only the sequence of motion, but also the visual appearance.

In an embodiment of the invention, provision is made that the recess is designed to accommodate the holder for the tension member. As a result, the second lever can be kept flat, thus saving material and weight, and also improving the visual appearance.

The holder can be located on a side of the second lever facing the first lever. This improves the leverage ratios and the visual appearance, since the holder is formed on the side facing away from the operator.

The lengths of the two levers can be approximately equal. This creates a uniform appearance and offers approximately the same required operating force to actuate the lever in each direction on account of equal or at least similar leverage ratios. Alternatively, the forces can be optimized depending on the situation. Thus, a lever used for raising the seat can be shorter than the other lever, which then preferably is used for returning the seat. This has the effect that actuating the lever for replacing is easier than for raising. This provides the adaptation that the action of raising, which tends to be performed from outside and thus with more force, and the action of replacing, which tends to be performed from inside and with less force, now demand approximately the same force from the operator. In this way, the levers or the leverage ratios can be adapted to different situations.

A recessed grip for actuating the second lever can be provided between the first and the second levers. For this purpose, one or both of the levers are shaped accordingly, which improves operating convenience without detriment to a quality appearance.

The two swivel pins can be parallel. This optimizes the sequences of motion and offers improved operating convenience since the pivoting motions of the two levers take place in the same orientation. The swivel pins can be parallel to an axis of pivoting or axis of motion of the seat adjuster, which permits intuitive operation.

The vehicle seat according to the invention having a seat adjuster that can be operated with a tension member can include an unlocking lever for the seat adjuster as described above. The same advantages and modifications apply as described above.

In an embodiment of the invention, provision is made that the seat adjustor pivots the entire motor vehicle seat. This comprehensive seat adjustment, and the one that is most difficult to actuate, is ideally suited for simplified unlocking according to the invention. Of course, it is also possible to pivot or incline only a backrest or a part thereof.

In an embodiment of the invention, provision is made that a recess is designed to accommodate the holder for the tension member. As a result, the first and/or the second lever can be kept flat, thus saving material and weight, and also improving the visual appearance.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
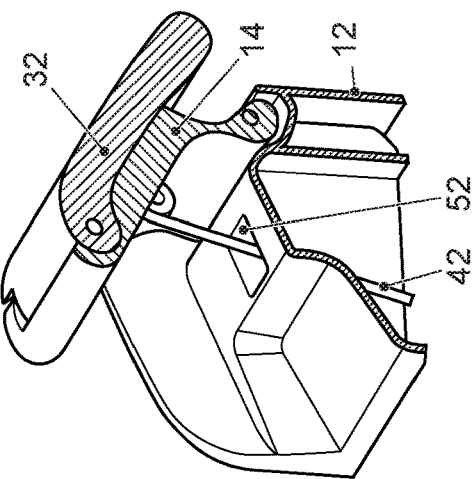
FIG. 1 shows an unlocking lever in an unactuated position.

FIG. 1 shows an unlocking lever 10 for a seat adjuster, not shown here, of a vehicle seat. The seat adjuster can pivot the entire vehicle seat as a so-called easy entry function. This typically takes place as a raising in the direction of travel and a returning of the seat opposite the vehicle's direction of travel. It is also possible to adjust individual elements of the seat, such as, e.g., the backrest or a part of the backrest, with the unlocking lever 10.

The unlocking lever 10 is arranged on a base part that can, for example, be part of a housing cover or seat cover. The unlocking lever 10 includes a first lever 14, which is attached to the base part 12 such that it can rotate about a first swivel pin 16. The first swivel pin 16 is parallel here to a pivot axis of the seat adjuster. In this example here, these two swivel pins are perpendicular to the vehicle's direction of travel. The first swivel pin 16 is located in the region of a first end or at a first end 18 of the first lever 14. With respect to the direction of travel, the first end 18 is located to the rear, so that the first lever 14 can be pivoted in a direction of actuation opposite the direction of travel.

Opposite the first end 18, the first lever 14 has a second end 20. Here, opposite means in a radial direction to the first swivel pin 16. A recessed grip 22 for actuating the first lever 14 is formed between a side of the first lever 14 facing the base part 12, here a bottom side, and a formation of the base part 12. A user can reach into the recessed grip 22, grasp beneath the second end 20 of the first lever 14, and pivot the same about the first swivel pin 16 in a raising motion.

A recess 24 is formed on the second end 20 of the first lever 14 on a side facing away from the base part 12, here a top side. Located in the recess 24 is a second swivel pin 26. The second swivel pin 26 is parallel to the first swivel pin 16. Here, the second swivel pin 26 is rigidly attached in the recess 24. Alternatively, the second swivel pin 26 can be supported such that it can rotate.

In a center region 28 of the first lever 14 located between the first end 18 and the second end 20, or between the first swivel pin 16 and the second swivel pin 26, this lever rests on a seat 30 of the base part 12. The seat 30 serves as a stop for the first lever 14 so that the lever can only be raised opposite the direction of travel from the home position or neutral position shown in FIG. 1.

Arranged on the second swivel pin 26 such that it is rotatable about the same is a second lever 32. The second lever 32 rests on the first lever 14 in such a manner that a first end 34 of the second lever 32 is located above the first end 18 of the first lever 14. A second end 36 of the second lever 32 is located in the region of the second swivel pin 26. A center region 38 of the second lever 32 is located between the first end 34 and the second end 36 of the second lever 32, or between the first swivel pin 16 and the second swivel pin 26.

Located between the first end 18 of the first lever 14 and the first end 34 of the second lever 32 is a recessed grip 40. The user can reach into this recessed grip 40 and thus lift or raise the second lever 32. The direction of actuation of the second lever 32 here is in the same direction as the vehicle's direction of travel. The second lever 32 can also be actuated without a recessed grip 40, but the grip facilitates the motion or the gripping of the second lever 32. Here, the first lever 14 is shaped to be tapered or angled at its first end 18 in order to thus form the recessed grip 40.

It is evident that the two levers 14 and 32 can be actuated in opposing directions. Using the two levers 14 and 32, it is possible to actuate a tension member 42 of the seat adjuster. The tension member 42 can be, for example, a connecting rod that is connected to a Bowden cable of the seat adjuster, or the tension member 42 can be the Bowden cable itself. The attachment and actuation of the tension member 42 is explained in detail in FIGS. 2 and 3.

Figure 2:
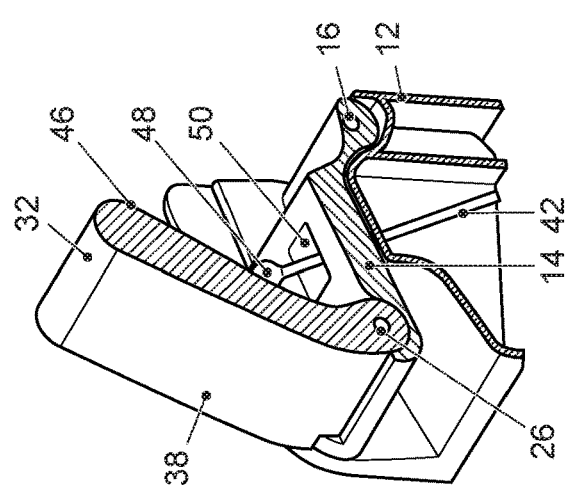
FIG. 2 shows the unlocking lever in a first unlocking position.
Figure 4:
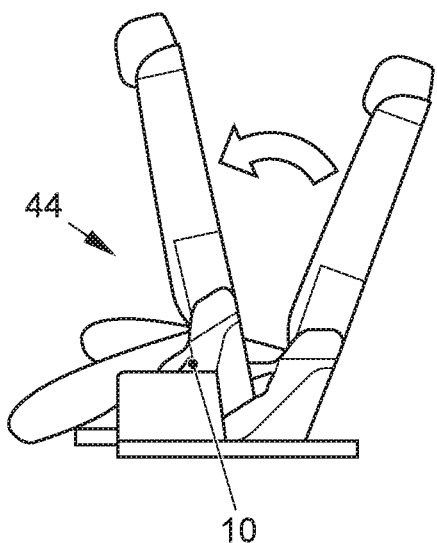
FIG. 4 shows a vehicle seat being raised.

The raising of a vehicle seat 44 will now be described using FIGS. 2 and 4. The second lever 32 is actuated for this purpose. A holder 48 for the tension member 42 is located on a side of the second lever 32 facing the first lever 14, here a bottom side 46. The holder 48 is located in the center region 38 of the second lever 32, which is to say between the first swivel pin 16 and the second swivel pin 26. Moreover, the holder 48 is located approximately in the center of the second lever 32 in an axial direction of the swivel pins 16 and 26. Alternatively, the holder 48 can also be located laterally on the second lever 32.

Formed in the first lever 14 is a recess 50, for example an opening or a through hole. The recess 50 corresponds to the holder 48 and permits passage of the tension member 42 and/or accommodation of the holder 48. Consequently, the tension member 42 can be moved independently of the first lever 14 with an actuation of the second lever 32.

If the second lever 32 is now raised in the direction of travel in the manner shown, the tension member 42 is pulled, resulting in activation of the seat adjuster. As is shown in FIG. 4, the seat is now raised to provide an entry function. In this process, the seat 44 is moved in the direction of travel, as well. The direction of actuation of the second lever 32 is thus the same as the direction of adjustment of the seat 44, permitting intuitive operation.

The lengths of the two levers 14 and 32 are identical or at least approximately identical, permitting balanced leverage ratios. The length can be understood here to mean the distance from the applicable first end to the applicable second end, or the distance from the applicable swivel pin that holds the lever to the opposite end.

The unlocking lever 10 is located in a lower side region of the vehicle seat 44, as shown. Alternatively, it is also possible to locate the unlocking lever 10 further up in the region of the backrest.

Figure 3:
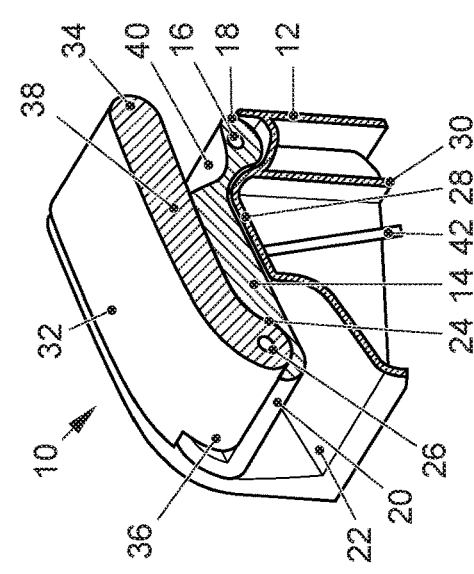
FIG. 3 shows the unlocking lever in a second unlocking position.
Figure 5:
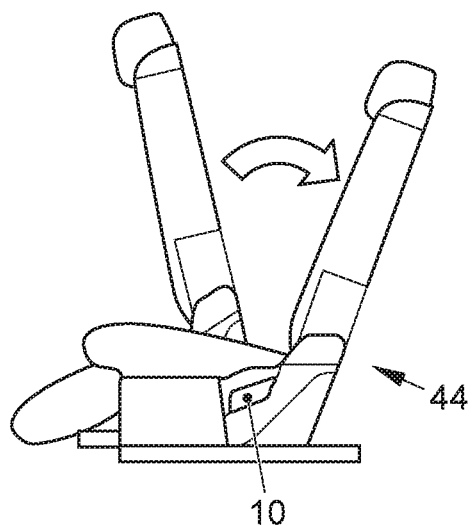
FIG. 5 shows a vehicle seat being returned.

The return of the seat from the entry function back to the seat function will now be described using FIGS. 3 and 5. For returning the seat 44, the first lever 14 is now actuated, as shown, in a direction opposite the direction of travel. In this process, the first lever 14 carries the second lever 32 with it. Because the holder 48 for the tension member 42 is located on the second lever 32, raising the first lever 14 also actuates the tension member 42 and hence the seat adjuster. As can be seen in FIG. 3, the holder 48 also extends through the recess 50 of the first lever 14. Accordingly, another corresponding recess 52, through which the tension member passes and/or that accommodates the holder 48, is formed in the base part 12 so that the two levers 14 and 32 can be made relatively thin and can rest snugly one upon the other.

To return the seat, the unlocking lever 10, here specifically the first lever 14, is moved opposite the direction of travel. As can be seen in FIG. 5, this matches the direction of adjustment of the vehicle seat 44, which is likewise replaced opposite the direction of travel. Consequently, intuitive operation is also possible for returning.

Due to the division of the unlocking lever 10 into the first lever 14 and the second lever 32, the direction of actuation of the unlocking lever 10 can match the direction of adjustment of the vehicle seat 44 in each case, permitting intuitive operation. In addition, the user has the option to freely choose the direction of actuation of the unlocking lever 10, since both levers 14 and 32 move the tension member 42 in the same direction and by at least approximately the same amount. Thus, the user can also accomplish the raising of the vehicle seat, which is shown in FIG. 4, by actuating the first lever 14, as shown in FIG. 3. Similarly, return of the seat 44, as shown in FIG. 5, can also be accomplished by actuating the second lever 32, as shown in FIG. 2. In this way, the unlocking lever 10 permits completely flexible operation of the seat adjuster of the vehicle seat 44.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An unlocking lever comprising:
a holder for a tension member of a seat adjustor of a vehicle seat;
a first lever that is rotatable about a first swivel pin disposed at a first end of the first lever; and
a second lever that is rotatable about a second swivel pin, the first and second levers being joined in an articulated manner via the second swivel pin, the second swivel pin being disposed at a second end of the first lever opposite to the first end,
wherein the holder for the tension member is located on the second lever between the first and second swivel pins, and
wherein the tension member is configured to move independently from the first lever by actuation of the second lever.

2. The unlocking lever according to claim 1, wherein the first lever has a recess for the tension member.

3. The unlocking lever according to claim 2, wherein the recess accommodates the holder for the tension member.

4. The unlocking lever according to claim 1, wherein the holder is arranged on a side of the second lever facing the first lever.

5. The unlocking lever according to claim 1, wherein lengths of the two levers are approximately equal.

6. The unlocking lever according to claim 1, wherein the two swivel pins are parallel.

7. An unlocking lever comprising:
a holder for a tension member of a seat adjustor of a vehicle seat;
a first lever that is rotatable about a first swivel pin disposed at a first end of the first lever; and
a second lever that is rotatable about a second swivel pin, the first and second levers being joined in an articulated manner via the second swivel pin, the second swivel pin being disposed at a second end of the first lever opposite to the first end,
wherein the holder for the tension member is located on the second lever between the first and second swivel pins,
wherein a recessed grip for actuating the second lever is provided between the first and the second levers.

8. A motor vehicle seat comprising:
a seat adjustor operatable with a tension member; and
an unlocking lever according to claim 1 provided for the seat adjuster.

9. The motor vehicle seat according to claim 8, wherein the seat adjuster pivots the entire motor vehicle seat.

10. The motor vehicle seat according to claim 8, wherein a recess accommodates the holder for the tension member.

11. An unlocking lever comprising:
a first lever having a first end and a second end radially opposite to the first end;
a first swivel pin disposed at the first end of the first lever, the first lever being rotatable about the first swivel pin;
a second lever; and
a second swivel pin disposed at the second end of the first lever, the second lever being pivotable with respect to the first lever about the second swivel pin,
wherein the tension member is configured to move independently from the first lever by actuation of the second lever.

12. The unlocking lever according to claim 11, further comprising:
a tension member of a seat adjustor of a vehicle seat; and
a holder for the tension member located on the second lever between the first swivel pin and the second swivel pin.

13. The unlocking lever according to claim 11, wherein the first swivel pin is parallel to the second swivel pin.

14. The unlocking lever according to claim 11, further comprising a recessed grip, for actuating the first lever, disposed beneath the second end of the first lever.

15. The unlocking lever according to claim 11, further comprising a base, the first lever being disposed on the base.

16. The unlocking lever according to claim 15, wherein the base comprises a seat, and
wherein the first lever rests on the seat.

17. An unlocking lever comprising:
a first lever having a first end and a second end radially opposite to the first end;
a first swivel pin disposed at the first end of the first lever, the first lever being rotatable about the first swivel pin;
a second lever;
a second swivel pin disposed at the second end of the first lever, the second lever being pivotable with respect to the first lever about the second swivel pin;
a tension member of a seat adjustor of a vehicle seat;
a holder for the tension member located on the second lever between the first swivel pin and the second swivel pin; and
a through hole disposed in the first lever,
wherein the tension member extends through the through hole to the second lever.

18. An unlocking lever comprising:
a first lever having a first end and a second end radially opposite to the first end;
a first swivel pin disposed at the first end of the first lever, the first lever being rotatable about the first swivel pin;
a second lever;
a second swivel pin disposed at the second end of the first lever, the second lever being pivotable with respect to the first lever about the second swivel pin;
a tension member of a seat adjustor of a vehicle seat; and
a holder for the tension member located on the second lever between the first swivel pin and the second swivel pin,
wherein the tension member is movable independently from an actuation of the first lever.

19. An unlocking lever comprising:
a first lever having a first end and a second end radially opposite to the first end;
a first swivel pin disposed at the first end of the first lever, the first lever being rotatable about the first swivel pin; and
a second lever; and
a second swivel pin disposed at the second end of the first lever, the second lever being pivotable with respect to the first lever about the second swivel pin,
wherein the second lever rests on the first lever such that a first end of the second lever is disposed above the first end of the first lever.

20. The unlocking lever according to claim 19, further comprising a recessed grip disposed between the first end of the first lever and the first end of the second lever.

21. An unlocking lever comprising:
a first lever having a first end and a second end radially opposite to the first end;
a first swivel pin disposed at the first end of the first lever, the first lever being rotatable about the first swivel pin;
a second lever; and
a second swivel pin disposed at the second end of the first lever, the second lever being pivotable with respect to the first lever about the second swivel pin,
wherein the first lever and the second lever are actuatable in opposing directions.

22. An unlocking lever comprising:
a tension member of a seat adjustor of a vehicle seat;
a holder for the tension member;
a first lever having a first end and a second end opposite to the first end;
a first swivel pin disposed at the first end of the first lever, the first lever being rotatable about the first swivel pin;
a second lever;
a second swivel pin disposed at the second end of the first lever, the second lever being rotatable about the second swivel pin relative to the first lever,
wherein the holder for the tension member is located on the second lever between the first swivel pin and the second swivel pin, and
wherein the tension member is configured to move independently from the first lever by actuation of the second lever.

* * * * *